INVENTORS:
JOSEPH P. HESLER,
WILLIAM PEIL,

BY Richard V. Lang
THEIR ATTORNEY.

INVENTORS:
JOSEPH P. HESLER,
WILLIAM PEIL,
BY Richard V. Lang
THEIR ATTORNEY.

INVENTORS:
JOSEPH P. HESLER,
WILLIAM PEIL,
BY Richard V. Lang
THEIR ATTORNEY.

United States Patent Office 3,462,745

Patented Aug. 19, 1969

3,462,745

APPARATUS FOR TRAVERSING DIGITAL INFORMATION ACROSS BAND-PASS TRANSMISSION MEDIA

Joseph P. Hesler, Liverpool, and William Peil, Syracuse, N.Y., assignors to General Electric Company, a corporation of New York Continuation of application Ser. No. 79,403, Dec. 29, 1960. This application Mar. 23, 1965, Ser. No. 445,838

Int. Cl. G11b 9/00

U.S. Cl. 340—173 9 Claims

ABSTRACT OF THE DISCLOSURE

Apparatus for providing traversal of a transmission medium exhibiting a band-pass frequency characteristic by a digital signal in pulse form, wherein the frequency response of said medium is critically related to the energy frequency spectrum of said digital signal so that the output signal has an energy frequency spectrum of relatively constant amplitude and is in the form of distinctly separate pulses. The present apparatus obviates the need to apply a signal to said transmission media as a modulated carrier or as a series of shock impulses of extremely short duration.

Figure 1:
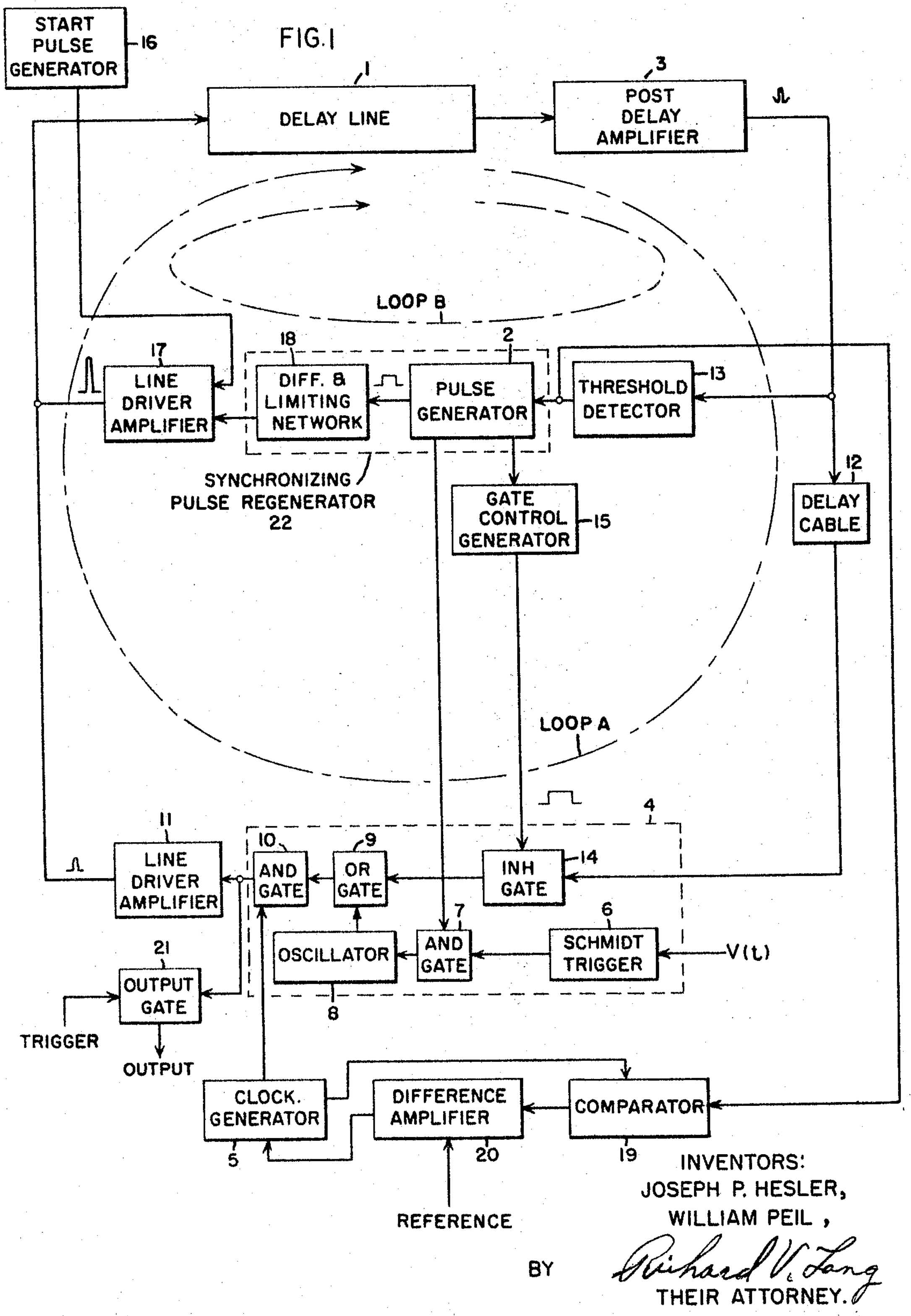

This application for U.S. Letters Patent is a continuation of applicants' copending application for U.S. Letters Patent, Ser. No. 79,403, filed Dec. 29, 1960, and assigned to the assignee of the present invention now abandoned.

The present invention relates to an improved method and apparatus for traversing digital information in electrical form across transmission media exhibiting a band-pass frequency characteristic. More particularly, the invention relates to quartz or silica delay lines, or delay lines of similar frequency characteristics, or to transmission lines such as telephone lines and the like having a limited pass band, and to the traversal thereof by digital information in monopolar pulse form at an improved bit rate.

Although the invention is generally applicable to transmission media having a band-pass frequency characteristic, it has particular application to time compression storage circuits of the type wherein a varying input signal is sampled at a fixed frequency and is connected through a delay line so as to provide a time compressed signal corresponding to the original input signal. The invention will be described with relation to one such time compression storage circuit which is disclosed in applicants' copending application entitled "Time Compression Storage Circuit," Ser. No. 79,424, filed Dec. 29, 1960, and assigned to the assignee of the present invention, now Patent No. 3,144,-638, issued Aug. 11, 1964. As noted in applicants' copending application, this circuit has primary application to deltic correlators commonly employed in sonar and radar equipment for the purpose of detecting signals having low signal to noise ratios.

In the prior art, quartz or similar delay lines are normally employed when it is desired to provide a relatively long delay to an applied signal. Although having desirable delay characteristics, these delay lines are high band-pass components having a limited bandwidth, which is undesirable when using conventional techniques for traversing said lines. In addition, for the condition of maximum obtainable bandwidth, which represents the limiting factor when contemplating passing digital signals of the maximum bit rate, the delay lines are normally characterized by the upper pass band frequency, $F_2$, being twice the lower pass band frequency $F_1$. Typically, $F_1=20$ megacycles and $F_2=40$ megacycles. Thus, digital information in conventional pulse form cannot be applied directly to the delay line, but must be transformed and applied either as a modulated carrier or as a series of shock impulses, with each impulse having a width small as compared to the time interval between successive impulses.

For a range of input frequencies comparable to the maximum bandwidth of the delay lines, neither of these techniques is satisfactory. Double sideband modulation allows utilization of but one-half one delay line bandwidth, thereby inherently limiting the frequency range of the input signals to one-half the absolute maximum. In addition, there is required the necessary modulator and demodulator components. Single sideband modulation allows greater utilization of the delay line bandwidth, although not utilization of the full bandwidth. This is because it is not feasible to equate the modulating signal to the carrier frequency, which would be necessary in view of $F_2$ being two times $F_1$. In addition, single sideband modulation requires extremely wide band single sideband modulators and demodulators, which are complex and expensive equipment.

In the impulse shocking technique it is often unrealizable to obtain pulses sufficiently narrow so as to utilize the full bandwidth of the delay line. Even should such narrow pulses be generated, this mode of operation is extremely inefficient since most of the generated energy would lie outside the pass band of the delay line. Thus, it may be seen that the above recited input techniques relating to a band-pass delay line are definitely limited in passing high frequency digital information.

In time compression storage circuits of the type to be described the bit rate of the digital information that can be applied to a given delay is directly related to the storage capacity of said delay line, and for numerous reasons it is desirable to maximize this storage capacity. For example, when considering time compression storage circuits employed in correlation operations, it is required that a minimum number of samples at least be stored and correlated in order to provide a reliable comparison of two or more wave forms. The number of samples that can be obtained, however, is limited by the storage capacity.

A further example of transmission media to which the invention has application are telephone lines, wherein the available pass band may be limited to, e.g., 500 kc. to 1 mc. Normally the lower frequencies may be filled with communication signals. When considering passing digital information through a pass band of such transmission media with a bit rate that is high relative to the pass band, e.g., 0–500 kc., there may be seen to exist similar problems as outlined above with relation to delay lines.

Accordingly, it is one object of the present invention to provide an improved method and apparatus for increasing the frequency range of digital information that is capable of traversing transmission media exhibiting a band-pass frequency characteristic.

Another object of the present invention to provide an improved method and apparatus for increasing the frequency range of digital information that is capable of transversing transmission media exhibiting a band-pass frequency characteristic.

Another object of the present invention is to provide a method and apparatus as recited above which is considerably simplified over that known in the prior art.

Another object of the present invention is to provide an improved method and apparatus for reducing the transmission characteristics, such as the bandwidth, required of a band-pass transmission medium being traversed by digital information.

A more detailed object of the invention is to provide an improved method and apparatus for passing digital information through a transmission medium exhibiting a band-pass characteristic wherein the frequency range of said information is equal to the maximum available bandwidth of the medium.

A further detailed object of the invention is to provide a time compression storage circuit employing a silica delay line in which the storage capacity for a given length of said delay line is increased over that known in the prior art.

These and other objects of the invention are accomplished in one embodiment of a time compression storage circuit in which a variable input signal is introduced and sampled at a predetermined sampling frequency. The information bits are circulated through a first closed path which comprises a plurality of gating means for sampling new information and passing recirculated prior information bits, a long delay line having a band-pass characteristic, typically a silica delay line, and a first short delay means serially connected in the order recited. The frequency of the time compressed signal is proportional to the number of information bit intervals in the delay line, in which the information bits are stored, divided by the length of the delay line. There is also provided a second closed path which also contains the recited long delay line. In this path is circulated a synchronizing pulse which is employed to actuate said gating means and said predetermined sampling frequency. The second closed path comprises a synchronizing pulse regenerator, said silica delay line and a threshold detector passing the synchronizing pulse and rejecting the information bits. The delay of the first closed path is slightly offset from the delay of the second closed path so that the information bits in the delay line shift relative to the synchronizing pulse as new information bits are stored. Thus, each information bit traverses said first closed path and re-enters the delay line before the succeeding information bit is obtained. In this manner successive information bits are recirculated in the path in close time relationship to provide a time compressed signal. Successive information samples are positioned in adjacent time slots.

In accordance with the invention, the frequency response of the delay line is matched to a characteristic of the shape of the information bit pulses applied to the delay line, so as to readily pass the applied pulse code. The information bits are preferably in the form of half sine wave pulses having a single polarity, which are convenient to generate. Each pulse has a fixed, constant pulse shape so as to be characterized by a given energy frequency spectrum, the envelope of said spectrum being characterized by a given slope in the region of the pass band of the delay line. The frequency response characteristic of the delay line and its associated circuitry is shaped so as to have an average slope reciprocally related to the average slope of the frequency spectrum envelope in the pass band region. In this manner, a considerable portion of the energy of the delayed information pulses appears at the output of the amplifier in the form of distinctly separate pulses of constant amplitude and shape. Information bits of a fixed wave form may thus be passed through the delay line and stored at a bit rate considerably higher than is possible using conventional techniques.

The invention will be better understood from the following description taken in connection with the accompanying drawings, while the novel and distinct features of the invention are particularly pointed out in the appended claims.

In FIGURE 1 is illustrated a block diagram of the time compression storage circuit in which the frequency response characteristic of the delay line and its associated circuitry is matched to the energy frequency spectrum of the individual information input pulses.

Figure 2:
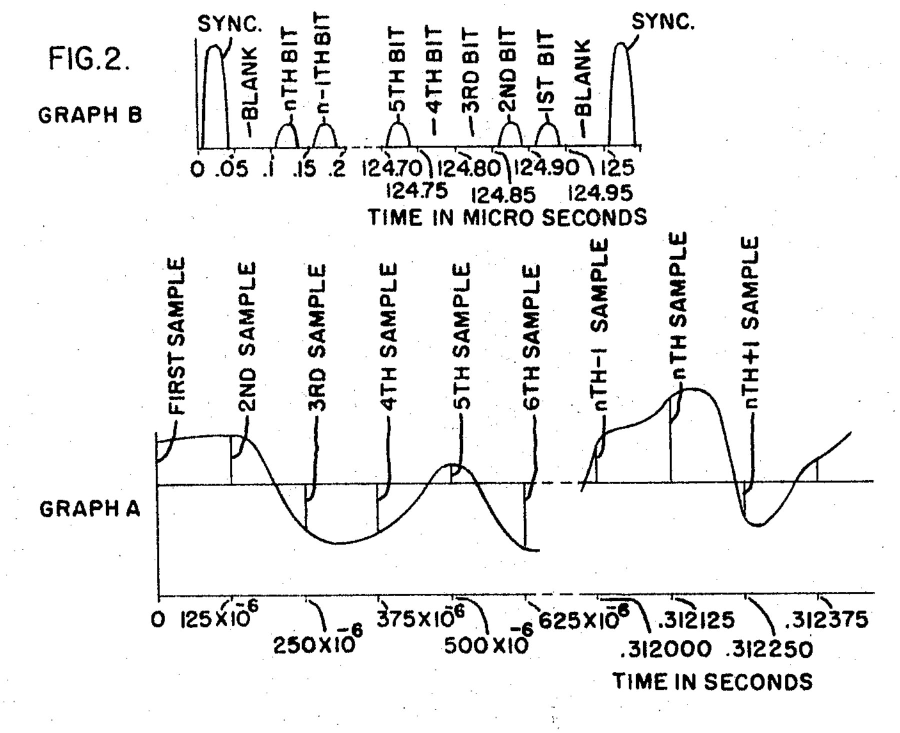

In FIGURE 2 is illustrated a series of graphs which help to illustrate the operation of the circuit of FIGURE 1.

Figure 3:
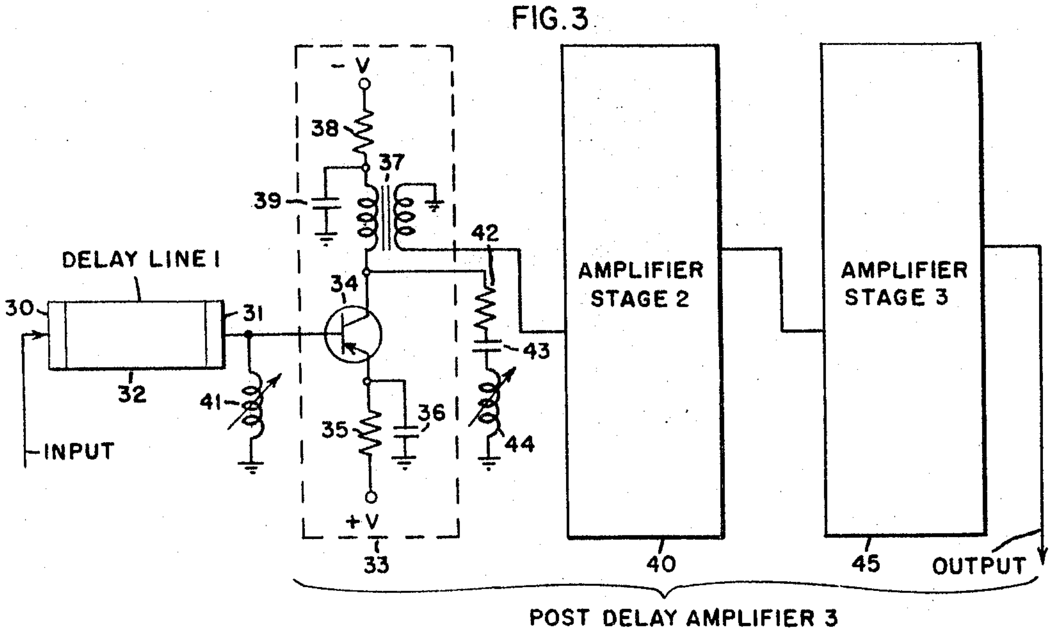

In FIGURE 3 there is shown in detail a schematic diagram of the delay line and post delay amplifier of FIGURE 1.

Figure 4:
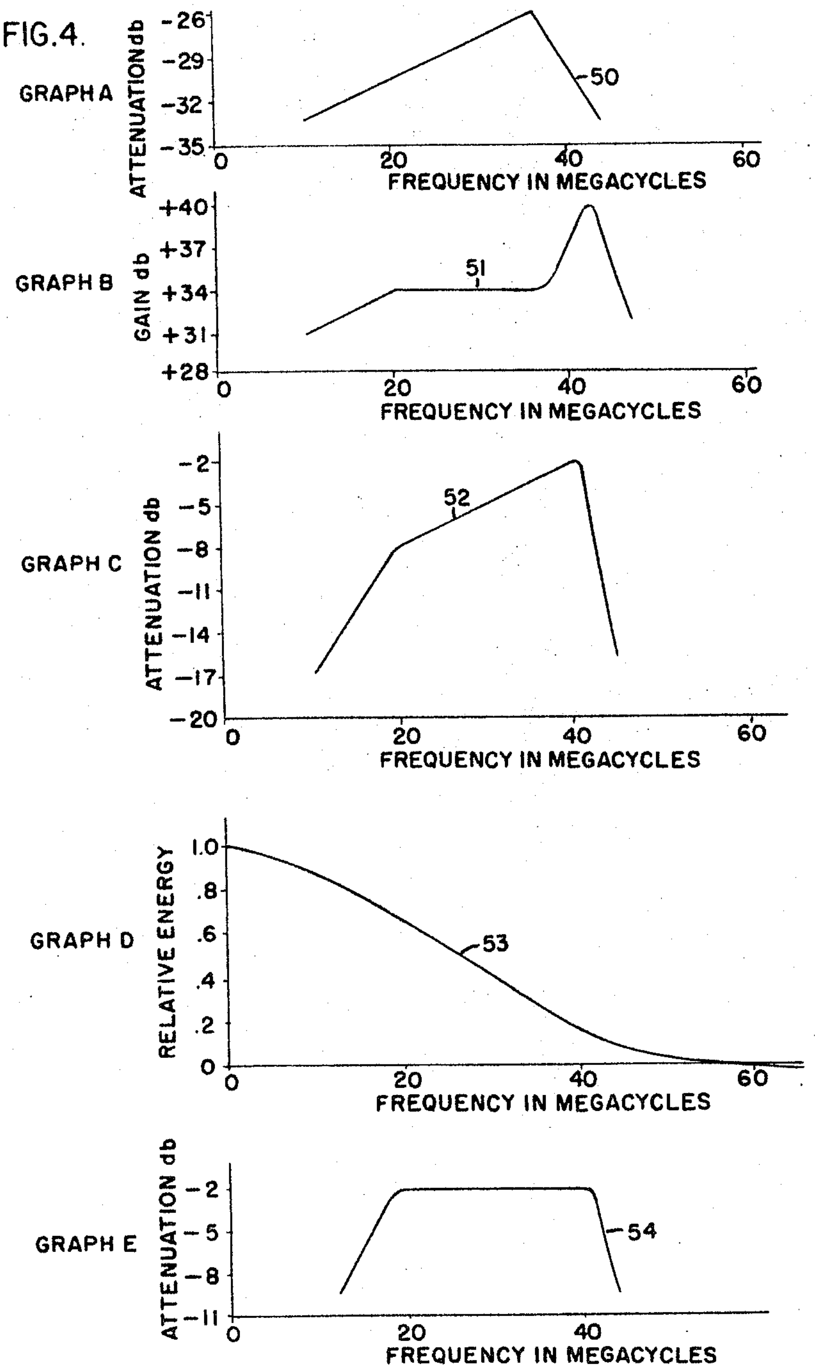

In FIGURE 4 are illustrated a series of graphs which help to illustrate FIGURES 1 and 3.

Referring now to FIGURE 1, there is illustrated a block diagram of a time compression storage circuit in which a variable input signal V($t$) is introduced and sampled at a predetermined synchronous sampling frequency. The information samples obtained are transformed into digital symbols or bits in the form of a pulse or absence of a pulse (where a pulse represents a positive portion of the input signal and the absence of a pulse represents a negative portion of the input signal). The information bits are circulated through and stored in a long band-pass delay line 1 having a delay time approximately equal to the inverse of the sampling frequency, so as to provide a time compressed signal whose duration is a small fraction of the original input signal. A synchronizing pulse from a synchronizing pulse regenerator 22 is also circulated through the delay line 1 and provides the sampling frequency. The frequency response characteristics of the band-pass delay line 1 and the post delay amplifier 3 are adjusted with relation to the shape of the input information pulses so that a high bit rate may be obtained in the delay line 1 with the direct application of readily generated input pulses.

In the time compression storage circuit under consideration, the delay line 1 provides a delay of 125 microseconds and is operated at a 20 megacycle bit rate. This yields a storage capacity of 2,500 bit intervals with a bit interval of 50 millimicroseconds. Transistor components have been employed in the storage circuit in one operative embodiment, but other components such as vacuum tubes and tunnel diodes may also be used.

The storage circuit may be considered to comprise three portions: (1) a first path closed by the delay line 1, forming information loop A, to time compress and store the information samples, (2) a logic network 4 employing a plurality of gating circuits, a portion of which is actually a part of the information loop, for timing and steering the recirculating information samples and the new samples, and (3) a second path also closed by the delay line 1, forming synchronizing loop B, for providing to the logic network 4 the proper sampling frequency. In addition, there is shown an automatic frequency control circuit for phase locking the synchronizing pulse to a clock signal from clock signal generator 5 which maintains a constant phase relationship between the information bits.

Considering first the information loop A together with logic network 4, a variable input signal V($t$), the wave form of which may be illustrated by the graph A of FIGURE 2, is connected to a conventional Schmitt Trigger Circuit 6 in logic network 4. Trigger 6 transforms the analog signal V($t$) into a digital signal of two prescribed logic levels, one level corresponding to a positive portion of V($t$) and a second level corresponding to a negative portion of V($t$). The output from trigger 6 is connected as a first input to AND gate 7, which may be a conventional resistor diode logic gate circuit. An output from the pulse generator 2 of the synchronizing loop B is connected as a second input to AND gate 7. With these two inputs present, a pulse from generator 2 is allowed to pass through AND gate 7 when V($t$) is positive.

The output of AND gate 7 is connected to the input of blocking oscillator 8. Blocking oscillator 8 is typically of the type having a differentiating network at the input for insuring operation at the leading edge of the pulse applied thereto and for providing an output pulse width independent of the trigger pulse. The output of blocking oscillator 8 is connected as a first input to OR gate 9, which may be a conventional resistor diode logic gate. A second input is connected to OR gate 9 from INHIBIT circuit 14, which may be considered to be a time responsive gate. The output of OR gate 9 is connected as a first input to AND gate 10, which is similar to AND gate 7. A clock signal from clock signal generator 5, a sine wave generator, is connected as a second input to AND gate 10. The frequency of the clock signal is equal to the bit rate of the time compressed signal circulating in the information loop, or in this instance 20 megacycles, as will be presently appreciated. With the two inputs to AND gate 10 present, a single positive half-cycle of the clock signal is allowed to pass, appearing at the output thereof as a single information bit pulse. The output of AND gate 10 is connected to the input of line driver amplifier 11. Amplifier 11 is a conventional component, typically connected in emitter follower fashion when considering transistor components. The output of amplifier 11 is connected to the input of the long delay line 1 for supplying information bit pulses of a constant amplitude.

In the embodiment being described, the delay line 1 is typically a fused silica delay line characterized by a band-pass frequency response, wherein for the maximum pass band obtainable, the upper pass band frequency, $F_2$, is approximately twice the lower pass band frequency, $F_1$. In the delay line under consideration, $F_1$ is approximately 20 magacycles and $F_2$ is approximately 40 megacycles.

The output of delay line 1 is connected to the input of a post delay amplifier 3, shown in detail in FIGURE 3, which amplifies the attenuated pulses received from delay line 1 so that the overall gain in the information loop, and also the synchronizing loop, is sufficient to maintain continuous regeneration of the circulating pulses. In accordance with the invention, the frequency response characteristic of the delay line 1 is compensated by the post delay amplifier 3 and the combined frequency response is controlled so that the slope of the attenuation vs. frequency response curve for the delay line 1 in combination with amplifier 3 is reciprocally related to the slope of the energy frequency spectrum of the individual information bit pulses traversing the delay line in the region of the pass band frequency of the delay line, 20 and 40 megacycles in this embodiment. This allows a considerable portion of the energy of the information bit pulses admitted to the delay line to pass through, while retaining a constant amplitude and width in the output pulses from the delay line, independent of the input code. In this manner pulses of a bit rate appreciably higher than in the prior art, a 20 megacycle bit rate in this instance, may be directly applied to the band-pass delay line. The above features of the invention will be described in greater detail when considering FIGURE 3.

The output of amplifier 3 is connected to a delay cable 12 which is a short delay means providing, in this embodiment, a delay of two information bit intervals, equal to 100 millimicroseconds. (It may be seen that a second output is also taken from amplifier 3, which is connected to threshold detector 13 of the synchronizing loop B.) The output of delay cable 12 is connected as a first input to INHIBIT circuit 14 of logic network 4. A second input is connected to INHIBIT circuit 14 from a gate control generator 15, contained in the synchronizing loop, for applying an inhibiting pulse. Gate control generator 15 comprises a blocking oscillator providing a pulse having a width of four bit intervals, or 200 millimicroseconds, which acts to prevent the pulses received from delay cable 12 from traversing the INHIBIT circuit 14 during the time the inhibiting pulse is applied. Thus, the delay cable 12 and the INHIBIT circuit 14 prevent the synchronizing pulse from circulating through the information loop A. They also assist in maintaining a separation between the synchronizing pulse and the information pulse. The output of INHIBIT circuit 14 is connected to OR gate 9 as the second input. The output of the time compression storage circuit is normally taken from the output of AND gate 10 through output gate 21.

Standardization of the information bit pulses by the clock signal maintain the bit pulses of constant amplitude and shape as they are recirculated. It also insures the positioning of each pulse at the center of the bit interval.

Considering now the synchronizing loop B, a start pulse generator 16 is connected as a first input to line driver amplifier 17, which may be an emitter follower amplifier similar to amplifier 11. Line driver amplifier 17 provides a synchronizing pulse at the output thereof having an amplitude a few magnitudes greater than the information pulses at the output of line driver amplifier 11, typically four or five times. The width of the synchronizing pulse is slightly more than one-half the information bit interval, as compared to the half interval width of the information bits. The output of line amplifier 17 is connected in common with the output of line driver 11 to the input of delay line 1. The previously referred to threshold detector 13 is connected to the output of amplifier 3 and is adjusted to pass only the synchronizing pulse and to reject the lower amplitude information bits. The gain of amplifier 3 is sufficient to cause the synchronizing pulse to exceed the threshold level.

A first output from threshold detector 13 is connected to the input of pulse generator 2, preferably in the form of a blocking oscillator, of the synchronizing pulse regenerator 22. Generator 2 provides a pulse having a width of three information bit intervals. A first output from pulse generator 2 is connected to the input of gate control generator 15 for triggering the inhibiting pulse generated therein. (A second output from generator 2 is connected to AND gate 7, as previously recited.) A third output from generator 2 is connected to the input of a differentiating and limiter network 18 of synchronizing pulse regenerator 22, which differentiates and passes only the trailing edge of the pulse from generator 2 to provide a succeeding synchronizing pulse delayed by three bit intervals. This is one more bit interval than the delay of delay cable 12, thereby permitting the information bits to slide by the synchronizing pulse in the delay line so that the synchronizing pulse always assumes a position two intervals behind the most recent information bit. The output from differentiating and limiter network 18 is connected as a second input to line driver amplifier 17. The standardization of the synchronizing pulses by the synchronizing pulse regenerator 22 maintains a constant amplitude synchronizing pulse as the pulse is recirculated.

Referring to the frequency control circuitry, a second output from threshold detector 13 is connected as a first input to a conventional comparator circuit 19, a second input to comparator 19 being connected from clock signal generator 5. Comparator 19 provides at the output an error signal which represents a measure of an out-phase condition between the synchronizing pulse and the clock signal. For proper phasing and zero error signal, the synchronizing pulse may be centered on the 180° crossing of the clock signal. The output from comparator 19 is connected as a first input to a conventional difference amplifier 20. A reference voltage is connected as a second input to difference amplifier 20, the difference of the two inputs providing a control signal at the output which is connected to the clock signal generator 5 to control the frequency thereof. Thus, should the synchronizing pulse be improperly phased with respect to the clock signal, normally resulting from a variation in the delay of the temperature sensitive delay line 1, the control signal frequency is accordingly adjusted to provide a proper phasing.

Considering the operation of the circuit of FIGURE 1 samples are taken of the input signal $V(t)$ at a fixed sampling period, as shown by the vertical solid lines in graph A of FIGURE 2. Upon being recirculated through the information loop, the information bits form a time compressed signal, as shown by graph B of FIGURE 2. The following relation must hold to perform this operation:

$$T_s = T_i \pm \tau_b \qquad (1)$$

where, $T_s$=Total delay in the synchronizing loop.

$T_i$=Total delay in the information loop.

$\tau_b$=Single bit interval=fifty millimicroseconds for a 20 megacycle bit frequency.

The choice of sign in Equation 1 determines the order in which the information bits of the time compressed signal will be read out of the storage circuit. In the present embodiment, the relation being considered is, $$T_s = T_i + \tau_b \quad (2)$$

This choice allows the informtion bits to be read out in their normal sequence and permits the information bits to slide by the synchronizing pulses in the delay line 1 and avoid intersymbol interference between the regenerated synchronizing pulse and the newest information bit. By sliding by it is meant that during each sampling period the recirculated bits advance one bit interval with respect to the synchronizing pulse.

With a delay provided by delay cable 12 of two bit intervals, or 100 millimicroseconds, and a delay in the synchronizing pulse regenerator 22 equal to three bit periods, or 150 millimicroseconds, the following equations may be written:

$$T_s = \tau_e + 3\tau_b = 125 \text{ microseconds} + 150 \text{ millimicroseconds} \quad (3)$$

$$T_i = \tau_e + 2\tau_b = 125 \text{ microseconds} + 100 \text{ millimicroseconds} \quad (4)$$

where $\tau_e$ is equal to the delay of the silica delay line 1. It may be seen that the requirement of Equation 2 is fulfilled.

Thus, the synchronizing loop generates a synchronizing pulse to provide a sampling frequency of $$\frac{1}{T_s} = \frac{1}{125.150 \text{ microseconds}} \sim$$

This frequency, together with a delay in the information loop of $T_I = 125.100$ microseconds, allows each information bit to traverse the information loop and be reinjected into the delay line in the bit interval in front of the succeeding information bit, with the synchronizing pulse following the newest information bit and separated therefrom by one blank interval, as shown in graph B in FIGURE 2.

A more detailed operation of the circuit may be found in applicants' aforementioned copending application.

In FIGURE 3 there is illustrated a schematic diagram of the delay line 1 and the frequency compensating post delay amplifier 3, the combined frequency response characteristic of which is adjusted to match the energy frequency spectrum of the individual half sine wave pulses admitted to the delay line. Thus, a major portion of the input energy is passed, appearing at the output of amplifier 3 as discrete pulses of constant wave form independent of the input code.

The fused silica delay line 1 is of conventional construction and includes a pair of transducer elements 30 and 31 at opposite ends of a silica material 32, which forms the delay medium. A more detailed disclosure of delay lines of this type may be found by referring to an article entitled "Designing Ultrasonic Delay Lines," by I. C. Miller and C. W. Sharek, published in Electronic Industries, July 1958. The output of the delay line is connected to the input of the first stage 33 of post of delay amplifier 3. The first stage 33 consists of PNP transistor 34 having emitter, base and collector electrodes. The emitter electrode is connected through a current limiting resistor 35 to a source of a positive voltage +V, and AC by-pass capacitor 36 shunting resistor 35 and being connected between the emitter and ground. The collector electrode is coupled by a series connection of the primary winding of output transformer 37 and a load resistor 38 to negative voltage −V. A by-pass capacitor 39 is connected between the junction of resistor 38 and said primary winding and ground. The secondary winding of transformer 37 couples the output of amplifier stage 33 to the input of a second amplifier stage 40, which is identical to the first stage. The output of second stage 40 is connected to the input of a third identical amplifier stage 45.

Shaping of the frequency response of the amplifier 3 is accomplished by a variable inductor 41 at the input of stage 33 and a series resonant circuit including a resistor 42, capacitor 43, and a variable inductor 44 at the output of stage 33. The inductor 41 is connected between the base electrode and ground, and the series resonant circuit is connected between the collector electrode and ground.

In one particular operative embodiment of the present circuit the following circuit parameters, which are given for the purposes of illustration and are not to be construed as limiting, were employed for the circuit of FIGURE 3.

| | |
|---|---|
| PNP transistor **34** | Type 2N509 manufactured by Western Electric. |
| Transformer **37** | 12 turns primary, 6 turns secondary Cambridge coil form LS6. |
| Variable inductors: | |
| **41** | 80 μμhenries. |
| **44** | .1 μhenry. |
| Resistors: | |
| **35** | 750 ohms. |
| **38** | 100 ohms. |
| **42** | 240 ohms. |
| Capacitors: | |
| **36** | .1 μfarad. |
| **39** | .0047 μfarad. |
| **43** | 10 μμfarads. |
| Voltage sources: | |
| +V | 10 volts. |
| −V | −10 volts. |
| Output terminal impedance of delay line **1** | 80 μμfarads. |

The band-pass characteristic of the fused silica delay line 1 is as shown by curve 50 graph A FIGURE 4 which is a plot of attenuation versus frequency. The curve peaks at approximately 35 megacycles with about a 6 db per octave roll-off on the lower end below 35 megacycles and a sharp 18 db per octave roll-off on the upper end beyond 35 megacycles. The illustrated curve is due to the characteristics of the transducers 30 and 31 located on either end of the line and the frequency characteristics of the silica delay medium 32. The transducers 30 and 31 have a positive and negative slope respectively of 6 db per octave on either side of a center frequency of 35 megacycles. The fused silica delay medium has a positive attenuation versus frequency slope that is a function of the line length, which for the delay line under consideration is in the order of 6 db per octave.

Considering the frequency response of the post delay amplifier 3, the inductor 41 is tuned to peak at a frequency of approximately 45–50 megacycles. The series resonant circuit of resistor 42, capacitor 43 and inductor 44 is tuned to provide a broad notched type filtering action resonating at approximately 30 megacycles. Thus, the frequency response characteristic for the post delay amplifier 3 is as shown by curve 51 in graph B of FIGURE 4, which is a plot of gain versus frequency. The curve is approximately flat between the 20 and 35 megacycles, having a roll-off of approximately 6 db per octave at the lower end and below 20 megacycles, rising to a peak at approximately 45 megacycles and then falling off sharply.

The combined frequency response of the delay line 1 and the post delay amplifier 3 as illustrated by curve 52 in graph C of FIGURE 4, which peaks at approximately the upper pass band $F_2$ of 40 megacycles and has approximately a 6 db per octave roll-off down to the lower pass band $F_1$ of 20 megacycles below which the curve falls off sharply, the curve also falling off sharply beyond 40 megacycles. The half sine wave input pulses applied to delay line 1 each has an energy frequency spectrum which may be expressed as:

$$G(f)=\int_{-\infty}^{+\infty} G(t)e^{(-2\pi jft)}dt \qquad (5)$$

This energy frequency spectrum is illustrated by curve 53 in graph D of FIGURE 4. The curve 53, it will be appreciated, forms the envelope of the energy frequency spectrum for a train of such input pulses. Between the frequencies, $F_1=20$ and $F_2=40$ megacycles, the slope of this curve provides a negative fall off of about 6 db per octave $$\left(\text{number of db}=10 \ln_{10} \frac{E1}{E2}\right)$$

which is the reciprocal of the positive slope of curve 52 in this frequency range. The result is that the frequency distribution of the energy of each pulse at the output of post delay amplifier 3 is of approximately constant amplitude as shown by curve 54 in graph E of FIGURE 4. Stated in another manner, at each discrete frequency between the frequencies $F_1$ and $F_2$, the product of the energy of the frequency spectrum curve 53 and the attention of the attenuation versus frequency curve 52 is approximately equal to a constant value. Sufficient information is contained in this band to readily reconstruct the original input code.

The recited circuitry permits digital information pulses having a bit rate of 0–20 megacycles to appear at the output of the post delay amplifier 3 by passing the energy contained in the 20–40 megacycle frequency band of each pulse. This energy forms at the output discrete equal energy pulses of constant wave form, independent of the input code, for input codes not exceeding 20 megacycles. The output pulse has a usable spike which is narrower than the input pulse. It should be pointed out that in order to provide output pulses of equal energy content it is necessary for the pass band of the compensated delay line to extend between the maximum bit rate $F_1$ and $2F_1$, or between higher order successive integral multiples of $F_1$, i.e., $2F_1$ to $3F_1$, $3F_1$ to $4F_1$, etc., with no zero crossings in the energy frequency spectrum within the pass band frequencies of the delay line. However, a pass band extending from $F_1$ to $2F_1$ with no zero crossings below $2F_1$ is optimum for providing the greatest quantity of energy in the output.

It may be seen when considering curve 53 that the energy of the input pulses contained in the frequency range between 20–40 megacycles is an appreciable portion of the total input energy. Further, it may be appreciated that the percentage of the total average energy contained within this band is greater at the higher bit rates. This is significant because it is at the higher bit rates that intersymbol interference must be avoided.

Although the present invention may be employed with input pulse of any desired shape that permits the energy frequency spectrum thereof to be matched to the frequency response of the transmission media in the manner described, the invention has particular application to the employment of half sine wave pulses since these pulses may be readily provided by a conventional sine wave generator.

Further, although of great advantage in applications relating generally to transmission media having a given pass band, the invention has been proven particularly successful in delay line applications by significantly increasing the bit rate of pulses applied thereto, and in fact has permitted a maximum bit rate equal to the pass band of the delay line. Accordingly, the operation of time compression circuits of the type described has been significantly improved.

In the operative embodiment described the bit rate is presented as 20 megacycles. However, since the maximum possible bit rate is a function of the bandwidth of the transmission medium, an improved delay line having a pass band of, e.g., 40–80 megacycles, can be employed to pass a 40 megacycle bit rate, as a result of the present teaching.

The invention has been described with reference to a specific operative embodiment, but it is obvious that the basic teaching thereof may be applied to many other and different circuits, being generally applicable to the passage of digital information through various types of transmission media having a given pass band. The appended claims are intended to include all modification and variations.

What we claim as new and desire to secure by Letters Patent of the United States is:

1. In combination, (a) means for generating a monopolar pulse of a given frequency characteristic wherein the energy frequency spectrum has a finite slope and no zero crossings over a given frequency range, (b) transmission means for producing a band-pass frequency characteristic within said frequency range whose attenuation versus frequency response curve has an average slope between the frequencies $F_1$ and $F_2$ that is reciprocally related to the average slope of said energy frequency spectrum between said frequencies, and (c) means for applying said pulse to said transmission means including means for combining said given frequency characteristic with said band-pass frequency characteristic so as to obtain a relatively constant product of the two between the frequencies $F_1$ and $F_2$ and thereby provide an output pulse having an energy frequency spectrum between said frequencies of relatively constant amplitude.

2. In combination, (a) means for generating monopolar pulses of a given frequency characteristic wherein the energy frequency spectrum of each pulse has a finite slope and no zero crossings over a given frequency range, (b) transmission means for producing a band-pass frequency characteristic within said frequency range whose attenuation versus frequency response curve has an average slope between the frequencies $F_1$ and $F_2$ that is reciprocally related to the average slope of said energy frequency spectrum between said frequencies, $F_1$ and $F_2$ being successive integral multiples of the maximum bit rate of said monopolar pulses, and (c) means for applying said pulses to said transmission means including means for combining said given frequency characteristic with said band-pass frequency characteristic so as to maintain a relatively constant product of the two between the frequencies $F_1$ and $F_2$ and thereby provide output pulses each having an energy frequency spectrum between said frequencies of relatively constant amplitude.

3. A combination as in claim 2 wherein $F_1$ is approximately equal to the maximum bit rate of said monopolar pulses and $F_2$ is approximately equal to $2F_1$.

4. In combination, (a) means for generating monoplar pulses of a given frequency characteristic wherein the energy frequency spectrum of each pulse has a finite slope and no zero crossings over a given frequency range, (b) delay means including a frequency compensating circuit for producing a band-pass frequency characteristic within said frequency range whose attenuation versus frequency response curve has an average slope between frequencies $F_1$ and $F_2$ that is reciprocally related to the average slope of said energy spectrum between said frequencies, $F_1$ and $F_2$ being successive integral multiplies of the maximum bit rate of said monopolar pulses, and (c) means for applying said pulses to said delay means including means for combining said given frequency characteristic with said band-pass frequency characteristic so as to maintain a relatively constant product of the two between the frequencies $F_1$ and $F_2$ and thereby provide output pulses each having an energy frequency spectrum between said frequencies of relatively constant amplitude.

5. A combination as in claim 4 wherein said delay means comprises a fused silica delay line.

6. A combination as in claim 5 wherein said compensating circuit comprises an amplifier having frequency shaping components, said amplifier being connected to the output of said delay line.

7. A combination as in claim 6 wherein said amplifier comprises three stages and said shaping components include a first variable inductor connected to the input of the first stage and a series connection of a second variable inductor, a capacitor and a resistor connected to the output of said first stage.

8. A time compression storage circuit to which is applied an electrical signal to be stored comprising:

(a) gating means for sampling said signal at a fixed time interval to obtain sampled information in the form of information bits, said information bits being monopolar pulses of a given frequency characteristic wherein the energy frequency spectrum of each pulse has a finite slope and no zero crossings over a given frequency range, (b) a first path closed through a compensated long delay means for producing a band-pass frequency characteristic within said frequency range whose attenuation versus frequency response curves has an average slope between the frequencies $F_1$ and $F_2$ that is reciprocally related to the average slope of said energy frequency spectrum between said frequencies, $F_1$ and $F_2$ being successive integral multiples of the maximum bit rate of said monopolar pulses, (c) means for introducing said information bits into said first path, (d) a second path also closed through said long delay means to which is introduced a synchronizing pulse for actuating said gating means, the delay of said second closed path being equal to said fixed time interval and slightly offset from the delay of said first closed path, (e) circuit means coupled to the output of said long delay means for selectively coupling said information bits to said first path and for selectively coupling said synchronizing pulses to said second path whereby said information bits are recirculated through said first closed path once per fixed time interval and are stored in said long delay means in adjacent bit time intervals equal to said offset as a time compressed signal corresponding to the applied signal which is compressed in time by an amount equal to the ratio of said fixed time interval to said offset.

9. A time compression storage circuit as in claim 8 wherein $F_1$ is approximately equal to the maximum bit rate of said information bits and $F_2$ is approximately equal to $2F_1$.

References Cited

UNITED STATES PATENTS

| | | | |
|---|---|---|---|
| 2,783,455 | 2/1957 | Hindall | 340—173 |
| 2,933,717 | 4/1960 | Tyas | 340—173 |
| 2,961,535 | 11/1960 | Lanning | 340—173 |
| 3,064,241 | 11/1962 | Schneider | 340—173 |
| 2,978,680 | 4/1961 | Shulte | 340—173 |

BERNARD KONICK, Primary Examiner

VINCENT P. CANNEY, Assistant Examiner